L. D. TAYLOR.
Combined Land Roller, Fertilizer and Seed Sower.
No. 79,280. Patented June 23, 1868.
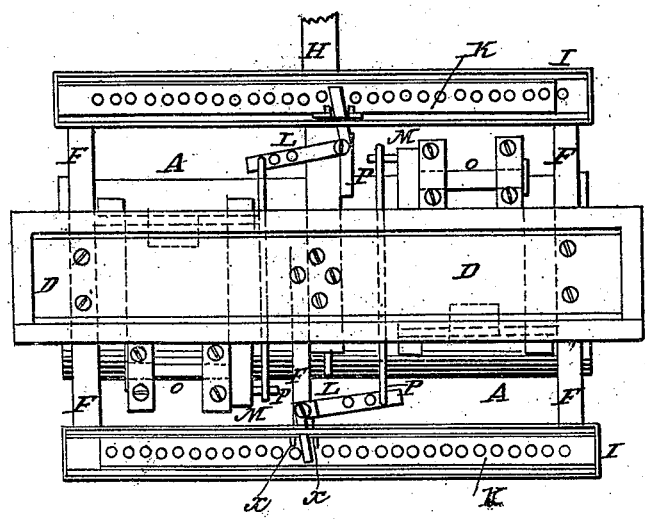
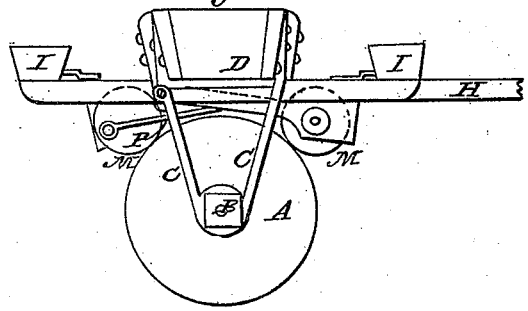
Witnesses:
Inventor.

United States Patent Office.

L. D. TAYLOR, OF GRANVILLE CENTRE, PENNSYLVANIA.

Letters Patent No. 79,280, dated June 23, 1868.

---

IMPROVEMENT IN COMBINED LAND-ROLLER, FERTILIZER, AND SEED-SOWER.

---

The Schedule referred to in these Letters Patent and making part of the same.

---

TO ALL WHOM IT MAY CONCERN:

Be it known that I, L. D. TAYLOR, of Granville Centre, in the county of Bradford, and in the State of Pennsylvania, have invented certain new and useful Improvements in Combined Land-Roller, Fertilizer, and Seed-Sower; and do hereby declare that the following is a full, clear, and exact description thereof, reference being had to the accompanying drawings, and the letters of reference marked thereon.

In the annexed drawings, making a part of this specification, A represents a cylindrical roller, made in two parts, and adjusted so as to revolve on the shaft or axle B.

C represents a metallic frame or bearing, made in the form shown, forming bearings for the shaft, and upon which is secured the box D. This box D is intended as a receptacle for placing seed or fertilizer.

The bearings C are adjusted, one at each end of the shaft B, and outside of the ends of the roller A. The box D is secured so as to be directly over the roller A, and has a suitable frame, F, secured to its under side, to which are secured other parts of this machine, to be hereinafter described.

Secured also to the under side of the box D are suitable bars, projecting both ways, which form bearings for the shafts O O. One end of the shafts O O is provided with a flange or collar, and the other end has the crank-wheel M secured thereto. The crank-wheels M rest against the face of the roller A, and are revolved thereby; said wheels are also provided with crank-pins, as shown, to which the pitmen P P are attached.

L L represent elbow-levers, one pivoted to the frame F, and one to the tongue or pole H, one end of each being attached to a pitman, P, and operated thereby.

I I represent boxes or troughs secured to the front and rear end of the frame F, and provided with a perforated bottom for the seed or fertilizer to pass through. The forward box, I, is intended for the seed, and the latter box, I, for the fertilizer, so that I am enabled, when desired, to sow the fertilizer and seed at one time. Adjusted inside of the boxes I I, and resting on the bottom thereof, are perforated sliding plates, K K, each provided with lugs or ears, X X, between which the ends of the levers L L catch and work.

The levers L L are provided with holes or perforations, in which the pitmen P P may be adjusted and pivoted at different distances from the fulcrum, so as to regulate the distance of the play or slide of the plates K K, and thereby regulate the flow of the seed or fertilizer through the perforations of said plates and the bottom of the boxes I I. The perforations of the plates K K and boxes I I may be made of any suitable size or form.

It will be seen that when this machine is in motion, the roller A will operate or give motion to the friction and crank-wheels M M, and they in turn will operate the pitmen P P, which move the arms or levers L L, and thereby the reciprocating plates K K.

It will also be seen that the above-described machine is cheap in construction, and effective as a land-roller and seed or fertilizer-drill or sower.

Having thus fully described my invention, what I claim as new, and desire to secure by Letters Patent, is—

The combination of the front and rear hoppers I I, and their respective plates K K, pitmen P P, levers L L, rollers M M, and cylinders A A, all constructed and operating substantially as specified.

In testimony that I claim the foregoing, I have hereunto set my hand, this 5th day of March, 1868.

L. D. TAYLOR.

Witnesses:
  E. S. BAILEY,
  LEVI TAYLOR.